United States Patent [19]

Piedrahita et al.

[11] Patent Number: 5,025,085

[45] Date of Patent: Jun. 18, 1991

[54] CURABLE AMINOPLAST COMPOSITIONS AND CATALYSTS FOR CURING SAME

[75] Inventors: Carlos A. Piedrahita, Mentor; Robert E. Quinn, Cleveland; John S. Perz, Mentor, all of Ohio

[73] Assignee: The Lubrizol Corporation, Wickliffe, Ohio

[21] Appl. No.: 432,233

[22] Filed: Nov. 6, 1989

[51] Int. Cl.$^5$ .............................................. C08L 61/28
[52] U.S. Cl. .................... 528/230; 528/233; 528/234; 528/239; 528/246; 528/265; 528/266; 525/163; 525/509; 525/518; 525/519
[58] Field of Search ............... 528/230, 233, 234, 239, 528/246, 265, 266; 555/163, 509, 518, 519

[56] References Cited

U.S. PATENT DOCUMENTS

| | | | |
|---|---|---|---|
| Re. 30,142 | 11/1979 | LeSuer | 252/46.7 |
| 2,757,152 | 7/1956 | Solomon | 524/598 |
| 3,451,968 | 6/1969 | Akiyama | 525/509 |
| 3,979,478 | 9/1976 | Gallacher | 525/153 |
| 4,026,812 | 5/1977 | LeSuer | 252/75 |
| 4,083,830 | 4/1978 | Gallacher | 528/254 |
| 4,178,323 | 12/1979 | Chattha | 525/188 |
| 4,843,126 | 6/1989 | Quinn | 525/162 |

OTHER PUBLICATIONS

Calbo, "Effect of Catalyst Structure on the Properties of Coatings, etc.", Journal of Coatings Tech., vol. 52, No. 660, Jan. 1980, pp. 75–83.

Bauer et al., "Crosslinking Chem. and Network Structure in Organic Coatings. etc.", Journal of Polymer Science, Polymer Physics Ed., vol. 18, pp. 2015–2025 (1980).

*Primary Examiner*—John Kight, III
*Assistant Examiner*—Sam A. Acquah
*Attorney, Agent, or Firm*—Robert A. Franks; Frederick D. Hunter; Forrest L. Collins

[57] ABSTRACT

The present invention relates to a curable composition comprising:

(A) at least one aminoplast resin; and
(B) an amount effective to cure the composition of at least one catalyst which is a sulfo acid, or an anhydride, ester, ammonium salt or metal salt of the acid.

The sulfo acid can be exemplified by sulfonic acids, such as 2-Acrylamido-2-methylpropane sulfonic acid, or a reaction product of the sulfonic acid and a phosphorus acid or salt, such as a dihydrocarbyl phosphorodithioic acid.

The catalyst allows curing of aminoplast resins to be accomplished at low temperatures, while imparting a high degree of water resistance to the cured coating.

51 Claims, No Drawings

CURABLE AMINOPLAST COMPOSITIONS AND CATALYSTS FOR CURING SAME

FIELD OF THE INVENTION

This invention relates to curable aminoplast compositions, and catalysts useful in curing said compositions. More particularly, it relates to the use of phosphorus-containing sulfonic acids or salts for curing urea-formaldehyde and melamine-formaldehyde and similar curable resin systems.

BACKGROUND OF THE INVENTION

Heat-convertible products attained by reacting amino-group containing compounds with aldehydes have been known for a number of years. Resins obtained by curing such reaction products possess an excellent combination of physical properties and are widely used in glues, in molding compounds, as finishes for paper and textiles and as surface coatings. The resins can be used per se or they can be further modified before curing by alkylation with an alcohol to provide for solubility and compatibility. The resins may also be modified before curing by mixing the resin with other materials capable of co-reacting with the resin, such compounds contain hydroxyl or carboxyl groups. This invention broadly is concerned with amino resins which are suitable for all conventional purposes.

U.S. Pat. No. Re. 30,142 and U.S. Pat. No. 4,026,812 both issued to LeSuer relate to additives for lubricating compositions prepared by the reaction of a phosphorus acid and a sulfur-containing compound with an ethylenically unsaturated double bond.

U.S. Pat. No. 2,757,152 issued to Solomon relates to water-repellent compositions prepared by a combination of a polysiloxane, and aminoplast resin and a curing agent wherein the curing agent is a metallic salt selected from a class consisting of inorganic or organometallic salts capable of effecting curing of the organopolysiloxane.

U.S. Pat. No. 3,451,968 issued to Akiyama relates to a faster cure of a urea-formaldehyde resin obtained by using a latent catalyst which is a mixture of a triester of phosphoric acid and an activator selected from the group consisting of trialkylphosphites.

U.S. Pat. No. 3,979,478 issued to Gallacher relates to amino resins which are catalyzed by the use of a high molecular weight polyalkylaromatic polysulfonic acid such as dinonylnaphthalene disulfonic acid or didodecylnaphthalene disulfonic acid.

U.S. Pat. No. 4,083,830 issued to Gallacher relates to amino resins prepared by the catalyst of a high molecular weight polyalkylaromatic polysulfonic acid.

U.S. Pat. No. 4,178,323 issued to Chattha relates to fast curing, high solids coating compositions consisting of a bifunctional polymer bearing hydroxy functionality together with a hydroxy functional acrylic organo phosphate reactive catalyst and optionally a hydroxy functional additive.

U.S. Pat. No. 4,843,126 issued to Quinn relates to aminoplast compositions and catalysts for curing the same. The catalyst is at least one organo substituted thiophosphoric, thiophosphonic or thiophosphinic acid or salt thereof.

A paper entitled "Effect of Catalyst Structure On The Properties of Coatings Crosslinked With Hexa(methoxymethyl)melamine", by Calbo, Journal of Coatings Technology, Volume 52, No. 660, January 1980, pages 75–83, relates to a study of the effects of dinonylnaphthalene disulfonic acid and para toluene sulfonic acid for controlling self condensation of hexa(methoxymethyl)melamine.

A paper entitled "Crosslinking Chemistry And Network Structure In Organic Coatings. II. Effect Of Catalysts On Cure Of Melamine Formaldehyde/Acrylic Copolymer Films", by D. R. Bauer and R. A. Dickie, Journal of Polymer Science: Polymer Physics Edition, Volume 18, pages 2015–2025 (1980), relates to the effects of four different acid catalysts on the curing of a melamine formaldehyde/acrylic copolymer film. The four acids investigated are p-toluene sulfonic acid, monobutyl maleate, butyl phosphate and a hydroxy phosphate ester.

Different catalysts affect cure rates as evidenced by the articles and studies performed in the art already. Minor changes in chemical structure can have effects on curing rates of resins which would lead to commercially significant effects.

SUMMARY OF THE INVENTION

The present invention relates to a curable comprising:
(A) at least one aminoplast resin; and
(B) an amount effective to cure the composition of at least one catalyst selected from the group consisting of
  (B-1) an acid, or an anhydride, ester, ammonium salt or metal salt of the acid that is represented by one of the formulae

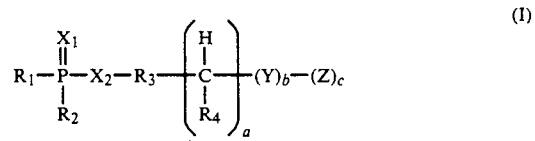

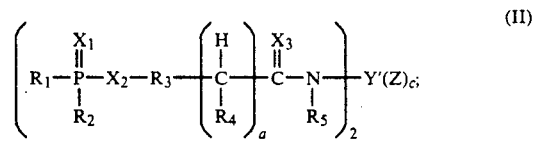

(B-2) an acid, or an ester, a metal salt or ammonium salt of a sulfo compound represented by the formula:

(B-3) an acid, or an ammonium or metal salt of a reaction product of at least one amine and the sulfo compound of (B-2); and mixtures thereof;
where in Formulae I and II
Each $R_1$ and $R_2$ is independently a hydrocarbyl or hydrocarbyloxy or hydrocarbylthio group;
where in Formulae I, II, and III
each $X_1$ and $X_2$ is independently sulfur or oxygen;
$R_3$ is a divalent hydrocarbyl group,
a is 0 or 1;
b is 0 or 1;
c is 1 or 2;
Y is a divalent or trivalent hydrocarbyl group or $-C(X_3)NR_5Y'$;
$X_3$ is sulfur or oxygen;

each $R_4$ and $R_5$ is independently hydrogen or hydrocarbyl group;

Y' is a divalent, trivalent or tetravalent hydrocarbyl group provided that Y' is not divalent in Formula II;

Z is —S(O)OH, or —S(O)$_2$OH.

A catalyst which allows curing of aminoplast resins to be accomplished at low temperatures and while imparting a high degree of water resistance to the cured coating is provided.

A feature of the invention is that the aminoplast resins are cured to a hard and water stable coating through the use of the technology described herein.

DETAILED DESCRIPTION OF THE INVENTION

Before the present compositions and process for making such are described, it is to be understood that this invention is not limited to the particular compositions or processes described as such compounds and methods may, of course, vary. It is also to be understood that the terminology used herein is for the purpose of describing particular embodiments only, and is not intended to be limiting since the scope of the present invention will be limited only by the appended claims.

It must be noted that as used in this specification and the appended claims, the singular forms "a", "an" and "the" include plural referents unless the context clearly dictates otherwise. Thus, for example, reference to "an aminoplast resin" includes mixtures of aminoplast resins, reference to "a catalyst" includes reference to mixtures of such catalysts, and so forth.

Unless the context indicates otherwise, the lists of groups are meant to encompass all isomeric arrangements of the groups. For instance, a pentyl group is meant to cover primary, secondary, tertiary and neo arrangements of the pentyl group.

Component (A)

The aminoplast resins of the present invention comprise in general the reaction product of an aldehyde or an aldehyde synthon with an amino or amido group containing compound. Typical examples of amino or amido compounds are urea, thiourea, melamine, substituted melamine, guanamines, substituted thioameline, triaminopyrimidine, 2-mercapto-4,6-diaminopyrimidine, 3,-5-diaminotriazole, carbamyl guanazole, 2,4-diaminothiodiazole, glycouril, 2-oxo,-4,5-diaminoparabanic acid, benzoguanadine or substituted benzoguanadines.

The aforementioned amino compounds are reacted with an aldehyde or an aldehyde synthon. An aldehyde synthon is a material which, although not being an aldehyde, reacts like an aldehyde. Paraformaldehyde is a well known aldehyde synthon. Useful aldehydes and aldehyde synthons are formaldehyde, paraformaldehyde, ethanal and butanal with formaldehyde and paraformaldehyde preferred. Creation of the aminoplast composition occurs by the reaction of the aforementioned amino compounds with aldehydes under conditions known in the art. The compounds formed by the aforementioned reactions are typically alkylolamino compounds. A typical example would be the reaction product of reaction of melamine with formaldehyde to form a hexamethyloxymethylmelamine. Aminoplast compositions are capable of autocondensation.

Typical examples of aminoplast compositions of the present invention are urea-formaldehyde condensates, formaldehyde substituted melamine condensates and benzoguanamine-formaldehyde condensates.

Some particularly well known aminoplast resins are amino resins sold by American Cyanamid under the trademark CYMEL. In particular, CYMEL 301, CYMEL 303, and CYMEL 1156, all of which are alkylated melamine-formaldehyde resins. Further melamine formaldehyde resins include CYMEL 350, 370, 373, 380, 1116, 1130 and 1158. Benzoguanamines are sold by American Cyanamid as CYMEL 1123, 1125 and 1134.

Various urea-formaldehyde resins included herein are available from American Cyanamid and include Beetle 60, 65, 80 and XB-1050. High imino melamine resins include CYMEL 323, 325, 327, and 385.

The aminoplast compositions as previously described are useful to form cured resins.

Aminoplast resins also known as amino resins useful in the present invention are described in Kirk Othmer's "Encyclopedia of Chemical Technology", 2d Edition, Vol. 2, pages 440–469 (incorporated herein by reference for its disclosure of amino resins).

Component (B)

The catalyst useful in the curing of aminoplast resins of the present invention is (B) an amount effective to cure the composition of at least one catalyst selected from the group consisting of (B-1) an acid, or an anhydride, ester, ammonium salt or metal salt of the acid that is represented by one of the formulae

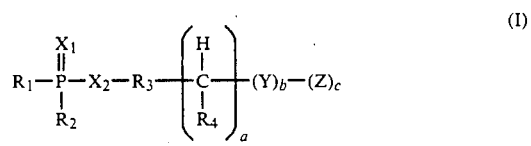

(I)

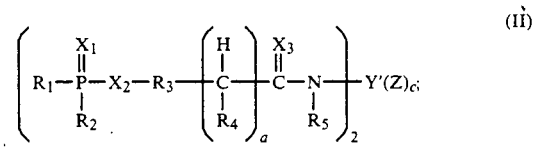

(II)

an acid, or an ester, a metal salt or ammonium salt of a sulfo compound represented by the formula:

(III)

(B-3) an acid, or an ammonium or metal salt of a reaction product of at least one amine and the sulfo compound of (B-2); and mixtures thereof;

where in Formulae I and II
each $R_1$ and $R_2$ is independently a hydrocarbyl or hydrocarbyloxy or hydrocarbylthio group;
where in Formulae I, II, and III
each $X_1$ and $X_2$ is independently sulfur or oxygen;
$R_3$ is a divalent hydrocarbyl group,
a is 0 or 1;
b is 0 or 1;
c is 1 or 2;
Y is a divalent or trivalent hydrocarbyl group or —C(X$_3$)NR$_5$Y';

$X_3$ is sulfur or oxygen;

each $R_4$ and $R_5$ is independently a hydrogen or hydrocarbyl group;

Y' is a divalent, trivalent or tetravalent hydrocarbyl group provided that Y' is not divalent in Formula II;

Z is —S(O)OH, or —S(O)$_2$OH.

Preferably each $R_1$ and $R_2$ is independently hydrocarbyl or hydrocarbyloxy containing from 1 to about 30 carbon atoms. In the preferred embodiment each $R_1$ and $R_2$ is independently an alkoxy group having from 2 to 24 carbon atoms, most preferably 2 to 12 carbon atoms, with 3 to 6 carbon atoms being particularly useful. In a preferred embodiment, each $R_1$ and $R_2$ is independently an alkoxy group having from about 4 to about 5 carbon atoms. In another embodiment each $R_1$ and $R_2$ is independently aryloxy having from 6 to 30 carbon atoms, most preferably 6 to 24 carbon atoms with 6 to 12 carbon atoms being particularly useful. It should also be noted that each $R_1$ and $R_2$ may be independently alkoxy or aryloxy.

Each $X_1$, $X_2$ and $X_3$ is independently sulfur or oxygen. $X_1$ and $X_2$ are preferably sulfur and $X_3$ is preferably oxygen.

In Formulae I, II, and III, each $R_4$ and $R_5$ is independently hydrogen or hydrocarbyl. In a preferred embodiment, each $R_4$ and $R_5$ is independently hydrogen or an alkyl group having from one to 12 carbon atoms preferably from one to about 6 carbon atoms. In a preferred embodiment, $R_4$ is hydrogen or methyl, preferably hydrogen. $R_5$ is preferably hydrogen.

In Formulae I, II, and III, each $R_3$, Y and Y' is independently a divalent, trivalent or tetravalent hydrocarbyl group, except in Formula II where Y' is not divalent. Each $R_3$, Y and Y' is independently selected from the group consisting of alkylene, alkylidine, arylene, arylidyne, alkylarylene, alkylarylidyne, arylalkylene and arylalkylidyne. $R_3$, Y and Y' contain from 1 to about 24 carbon atoms except when $R_3$, Y or Y' are arylene when they contain from 6 to about 24 carbon atoms. Preferred carbon atom ranges for $R_3$, Y and Y' are 1 to about 18 and more preferably 1 to about 12 carbon atoms. When $R_3$, Y and Y' are arylene, the preferred size of the group is from 6 to about 18 carbon atoms, with 6 to about 12 carbon atoms being more preferred. Y is preferably alkylene or —C($X_3$)NR$_5$Y', with —C($X_3$)NR$_5$Y' being most preferred.

In a preferred embodiment, $R_3$ is methylene, ethylene or propylene, with methylene more preferred.

Examples of divalent hydrocarbyl groups for Y and Y' include, but are not limited to, methylene, ethylene, propylene, butylene, octylene, decylene, tolylene, naphthylene, cyclohexylene, cyclopentylene, dimethylalkoxy ethylene, diethylethylene, butylpropylethylene and the like. When Y and Y' are trivalent hydrocarbyl groups, the groupings are the same except that a hydrogen atom is removed from a carbon atom in a member of the above list. For instance, when a hydrogen atom is removed from ethylene, the group becomes ethylidene, and so forth.

Component (B-1)

Component (B-1) may be prepared by the reaction of a sulfo compound with a phosphorus acid or salt. The phosphorus acid or salt are represented by the following formula,

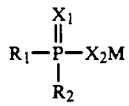

wherein $R_1$, $R_2$, $X_1$, $X_2$ are as defined above and M is a hydrogen or a metal ion, wherein the metal of which is described below. The description of the phosphorus acids also applies to the salts of phosphorus acids in terms of structure and composition.

The phosphorus acids useful in the present invention are phosphoric; phosphonic; phosphinic; thiophosphoric, including dithiophosphoric as well as monothiophosphoric; thiophosphinic or thiophosphonic acids. It must be noted that the use of the term thiophosphoric, thiophosphonic or thiophosphinic acids are also meant to encompass monothio as well as dithio derivatives of these acids. In a preferred embodiment of the present invention, the phosphorus acid compound is a dithiophosphoric acid. The dithiophosphoric acids of particular interest are 0,0-dihydrocarbylphosphorodithioic acids also known as dihydrocarbyldithiophosphoric acid. The dihydrocarbylphosphorodithioic acids may have hydrocarbyl groups which are the same or different. Dihydrocarbyldithiophosphoric acids include dialkyldithiophosphoric acids. Examples of alkyl groups on the dithiophosphoric acids include: dipropyl, dibutyl, dipentyl, dihexyl, dioctyl and etc. Examples of dihydrocarbyldithiophosphoric acids include dialkyldithiophosphoric acids. Specific examples of mixed alkyl groups on the dialkyldithiophosphoric acids include: methyl, butyl; propyl, butyl; amyl, butyl; hexyl, butyl; pentyl, octyl; hexyl, decyl; butyl, behenyl; and octyl, dodecyl.

The dihydrocarbyl phosphorodithioic acids may be prepared by reaction of alcohols or phenols with $P_2S_5$ between the temperature of about 50° C. to about 150° C. Often the alcohols or mixtures of alcohols are reacted with $P_2S_5$ to form the dithiophosphoric acids or salts. Preparation of dithiophosphoric acids and their salts is well known to those of ordinary skill in the art.

The phosphorus acid compounds previously described are reacted with sulfo compounds of the general formulae:

or

wherein $R_4$, b, c, Y and Z are as defined previously. W is hydrogen or a halogen atom provided that only one W is a halogen atom. W is preferably selected from the group consisting of chlorine, bromine and iodine groups, with chlorine being preferred.

The above described sulfo compounds may be reacted with the phosphorus acids or salts at a temperature between about 25° C. and about 250° C., preferably about 50° C. to about 150° C.

Useful sulfo compounds are sulfonic acid containing compounds. Sulfonic acid containing compounds useful in the present invention are vinyl alkyl sulfonic acids, halosulfonic acids, and vinyl aromatic sulfonic acids. Examples of useful sulfonic acid compounds, which are represented by Formula III above, are vinyl sulfonic acid, vinyl naphthalene sulfonic acid, vinyl anthracene sulfonic acid, vinyl toluene sulfonic acid, and acrylamidohydrocarbyl sulfonic acid. Examples of useful sulfonic acid compounds, which are represented by Formula V, are chlorobutyl sulfonic acid, chloropropane sulfonic acid, and chloroethane sulfonic acid.

A particularly useful acrylamidohydrocarbyl sulfonic acid is 2-acrylamido-2-methylpropane sulfonic acid. Other useful sulfo compounds are as follows: 2-acrylamidoethane sulfonic acid, 2-acrylamidopropane sulfonic acid, 3-methylacrylamidopropane sulfonic acid, 1,1-bis(acrylamido)-2-methylpropane-2-sulfonic acid.

It should be noted that the reaction of the phosphorus acid or salt and the sulfo compound may occur between a phosphorus acid or salt and a sulfo acid as well as a sulfo anhydride, ester, ammonium salt or metal salt.

The catalysts of the present invention may be an acid, ester, ammonium salt or metal salt.

The ester may be formed by one of the above acids reacting with 1) a trialkylphosphate; 2) sulfur trioxide and an alcohol; 3) dialkylsulfate in dimethylformamide; 4) silver oxide and alkyl halide; and 5) alkylene oxide. The reactions described above are known to those in the art.

Preferred esters are those having from 1 to about 40, preferably from 1 to about 20, more preferably from 1 to about 10, more preferably from 1 to about 6 carbon atoms in the ester group.

The preparation of esters of amidoalkane sulfonic acid is described in U.S. Pat. Nos. 3,937,721; 3,956,354; 3,960,918; and German patent 2,420,738.

The ammonium salts of the acid are obtained from a sulfo acid and an amine. The reaction occurs at a temperature between about 30° C. to about 110° C., with about 30° C. to about 80° C. preferred. The reaction generally occurs with one NH group from the amine reacting with one OH of the sulfo acid.

The ammonium salts of the sulfo acids useful in the present invention may be prepared from ammonia, a monoamine or a polyamine.

The monoamines generally contain from 1 to about 24 carbon atoms, with 1 to about 12 carbon atoms being more preferred, and from 1 to about 6 carbon atoms being more preferred. Examples of monoamines useful in the present invention include methylamine, ethylamine, propylamine, butylamine, octylamine, and dodecylamine. Examples of secondary amines include dimethylamine, diethylamine, dipropylamine, dibutylamine, methylbutylamine, ethylhexylamine, etc. Tertiary amines include trimethylamine, tributylamine, methyldiethylamine, ethyldibutylamine, etc.

In another embodiment the amines are hydroxyamines. Typically, the hydroxyamines are primary, secondary or tertiary alkanol amines or mixtures thereof. Such amines can be represented by the formulae:

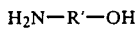

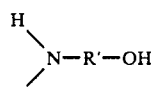

and

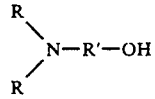

wherein each R is independently a hydrocarbyl group of one to about eight carbon atoms or hydroxyhydrocarbyl group of two to about eight carbon atoms and R' is a divalent hydrocarbyl group of about two to about 18 carbon atoms. The group —R'—OH in such formulae represents the hydroxyhydrocarbyl group. R' can be an acyclic, alicyclic or aromatic group. Typically, R' is an acyclic straight or branched alkylene group such as an ethylene, 1,2-propylene, 1,2-butylene, 1,2-octadecylene, etc. group. Where two R groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like. Typically, however, each R is a lower alkyl group of up to seven carbon atoms.

The hydroxyamines can also be an ether N-(hydroxyhydrocarbyl)amine. These are hydroxypoly(hydrocarbyloxy) analogs of the above-described hydroxy amines (these analogs also include hydroxyl-substituted oxyalkylene analogs). Such N-(hydroxyhydrocarbyl) amines can be conveniently prepared by reaction of epoxides with afore-described amines and can be represented by the formulae:

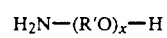

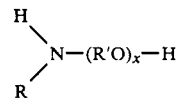

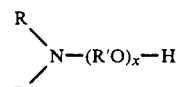

wherein x is a number from about 2 to about 15 and R and R' are as described above. R may also be a hydroxypoly(hydrocarbyloxy) group.

The polyamines may be aliphatic, cycloaliphatic, heterocyclic or aromatic. Examples of the polyamines include alkylene polyamines and heterocyclic polyamines.

Alkylene polyamines are represented by the formula

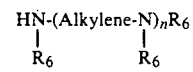

wherein n has an average value between about 1 and about 10, preferably about 2 to about 7 and the "Alkylene" group has from 1 to about 10 carbon atoms, preferably about 2 to about 6 carbon atoms. $R_6$ is independently preferably hydrogen; or an aliphatic or hydroxy-substituted aliphatic group of up to about 30 carbon atoms.

Such alkylene polyamines include methylene polyamines, ethylene polyamines, butylene polyamines, propylene polyamines, pentylene polyamines, etc. The higher homologs and related heterocyclic amines such as piperazines and N-amino alkyl-substituted piperazines are also included. Specific examples of such polyamines are ethylene diamine, triethylene tetramine, tris-(2-aminoethyl)amine, propylene diamine, trimethylene diamine, tripropylene tetramine, tetraethylene pentamine, hexaethylene heptamine, pentaethylenehexamine, etc.

Higher homologs obtained by condensing two or more of the above-noted alkylene amines are similarly useful as are mixtures of two or more of the aforedescribed polyamines.

Ethylene polyamines, such as some of those mentioned above, are useful. Such polyamines are described in detail under the heading Ethylene Amines in Kirk Othmer's "Encyclopedia of Chemical Technology", 2d Edition, Vol. 7, pages 22–37, Interscience Publishers, New York (1965). Such polyamines are most conveniently prepared by the reaction of ethylene dichloride with ammonia or by reaction of an ethylene imine with a ring opening reagent such as water, ammonia, etc. These reactions result in the production of a complex mixture of polyalkylene polyamines including cyclic condensation products such as the aforedescribed piperazines. Ethylene polyamine mixtures are useful.

Polyamine analogs of the hydroxy monoamines, particularly alkoxylated alkylene polyamines (e.g., N,N-(diethanol)-ethylene diamine) can also be used. Such polyamines can be made by reacting alkylene amines (e.g., ethylenediamine) with one or more alkylene oxides (e.g., ethylene oxide, octadecene oxide) of two to about 20 carbons. Similar alkylene oxide-alkanol amine reaction products can also be used such as the products made by reacting the aforedescribed primary, secondary or tertiary alkanol amines with ethylene, propylene or higher epoxides in a 1.1 to 1.2 molar ratio. Reactant ratios and temperatures for carrying out such reactions are known to those skilled in the art.

Specific examples of alkoxylated alkylene polyamines include N-(2-hydroxyethyl) ethylene diamine, N,N-bis(2-hydroxyethyl)-ethylene-diamine, 1-(2-hydroxyethyl)piperazine, mono(hydroxypropyl)-substituted tetraethylene pentamine, N-(3-hydroxybutyl)-tetramethylene diamine, etc. Higher homologs obtained by condensation of the above-illustrated hydroxy alkylene polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid polyamines are also useful.

Among the heterocyclic polyamines are aziridines, azetidines, azolidines, tetra- and dihydropyridines, pyrroles, indoles, piperidines, imidazoles, di- and tetrahydroimidazoles, piperazines, isoindoles, purines, morpholines, thiomorpholines, N-aminoalkylmorpholines, N-aminoalkylthiomorpholines, N-aminoalkylpiperazines, N,N'-diaminoalkylpiperazines, azepines, azocines, azonines, azecines and tetra-, di- and perhydro derivatives of each of the above and mixtures of two or more of these heterocyclic amines. Preferred heterocyclic amines are the saturated 5- and 6-membered heterocyclic amines containing only nitrogen, oxygen and/or sulfur in the hetero ring, especially the piperidines, piperazines, thiomorpholines, morpholines, pyrrolidines, and the like. Piperidine, aminoalkyl-substituted piperidines, piperazine, aminoalkyl-substituted piperazines, morpholine, aminoalkyl-substituted morpholines, pyrrolidine, and aminoalkyl-substituted pyrrolidines, are especially preferred. Usually the aminoalkyl substituents are substituted on a nitrogen atom forming part of the hetero ring. Specific examples of such heterocyclic amines include N-aminopropylmorpholine, N-aminoethylpiperazine, and N,N'-diaminoethylpiperazine.

Hydroxy heterocyclic polyamines are also useful. Examples include N-(2-hydroxyethyl)cyclohexylamine, 3-hydroxycyclopentylamine, parahydroxyaniline, N-hydroxyethylpiperazine, and the like.

The metal salts of the sulfo compounds may be prepared by the reaction of the sulfo compounds with an alkali, an alkaline earth, or a transition metal. The reaction usually occurs at a temperature of from about 30° C. to about 150° C., with about 30° C. to about 125° C. being preferred. The sulfo compound is reacted with the metal compound in roughly stoichiometric amounts. It should be noted that a slight excess of metal containing compound may be used.

The metals of the metal containing compound may be zinc, nickel, cobalt, iron, manganese, sodium, potassium, calcium, tin and magnesium. Zinc or magnesium is the preferred metal, with zinc more preferred.

The metal salts may also be prepared by the reaction of a sulfo compound with a phosphorus acid salt. The metal of the phosphorus acid salt becomes the metal of the metal salt of the sulfo compound.

The following examples are provided so as to provide those of ordinary skill in the art with a complete disclosure and description of how to make the compounds and compositions of the invention and are not intended to limit the scope of what the inventors regard as their invention. Efforts have been made to insure accuracy in the following Examples and others contained in this specification with respect to numbers used (e.g. amounts, temperature, etc.) but some experimental errors and deviation should be accounted for. Unless indicated otherwise in the following Examples and elsewhere in the specification and claims, parts are parts by weight, temperature is in degrees Centigrade, and pressure is at or near atmospheric.

EXAMPLE 1

Add 852 parts (2 equivalents) of di-2-ethylhexyl dithiophosphoric acid, 300 parts isopropyl alcohol, and 300 parts methylamyl alcohol to a vessel. Add 414 parts (2 moles) of 2-acrylamido-2-methyl-propane sulfonic acid. Heat the reaction mixture to 80° C. to 90° C. for three hours. Cool the reaction to 40° C. and decant the product. The product has a neutralization acid number of 60.8. The product has a percent nitrogen of 1.45; a percent sulfur of 11.15; and a percent phosphorus of 3.81.

EXAMPLE 2

Following the same procedure as Example 1, add 957 parts (3 equivalents) of isopropyl, methylamyldithiophosphoric acid, 300 parts of isopropyl alcohol, 400 parts of methylamyl alcohol, and 621 parts (3 equivalents) of 2-acrylamido-2-methylpropane sulfonic acid.

This product has a neutralization number of 75.2 with a percent nitrogen of 1.78; percent sulfur of 12.94; and a percent phosphorus of 4.24.

EXAMPLE 3

Following the same procedure as Example 1, add 463 parts (1.6 equivalents) of isobutyl, amyl dithiophosphoric acid zinc salt, 649 parts of isopropyl alcohol, 683 parts of methyl alcohol, and 173 parts (1.6 equivalents) of vinyl sulfonic acid.

EXAMPLE 4

Following the same procedure as Example 1, except that 463 parts (1.6 equivalents) of isobutyl, amyl dithiophosphoric acid zinc salt, 649 parts of isopropyl alcohol, 683 parts of methyl alcohol, and 295 parts (1.6 equivalents) of styrene sulfonic acid are used.

EXAMPLE 5

Add 366 parts (1.25 equivalents) of isobutyl, amyl dithiophosphoric acid zinc salt having a phosphorus content of 10.4% and which is oil free, 508 parts of isopropyl alcohol, and 539 parts of methyl alcohol to a vessel. Add 259 parts (1.25 equivalents) of 2-acrylamido-2-methylpropane sulfonic acid portionwise over 30 minutes. Heat the mixture to 70° to 80° C. for six hours. The reaction is cooled to 40° and filtered through paper. The product shows no vinyl group absorbance according to infrared spectroscopy (IR) and has a neutralization number of 1.7. The product contains approximately 40% nonvolatiles, and has specific gravity of 0.926 at 25° C.

EXAMPLE 6

Following the same procedure as Example 5, add 210 parts (0.5 equivalents) of di(2-ethylhexyl)dithiophosphoric acid zinc salt which has a phosphorus content of 7.39%, 400ml of isopropyl alcohol and 83ml of water distilled. To this mixture is added 103 parts (0.5 equivalents) of 2-acrylamido-2-methylpropane sulfonic acid. The product has a neutralization number of approximately 9 and a percent nitrogen of 2.2, a percent sulfur of 15.3, a percent phosphorus of 5.0 and a percent zinc of 5.4.

EXAMPLE 7

Following the same procedure as Example 5, add 298 parts (0.5 equivalents) of a $diC_{12-14}$ dithiophosphoric acid zinc salt having a phosphorus content of 5.2% and a neutralization number of 10.2, 450ml of isopropylalcohol, and 90ml of water. To this mixture add 104 parts (0.5 equivalents) of 2-acrylamido-2-methylpropane sulfonic acid. After elimination of the vinyl group absorbance as measured by IR, the product has a neutralization number of 19.4, percent nitrogen of 1.5, percent sulfur of 11.8, percent phosphorus of 3.95, and a percent zinc of 3.7.

EXAMPLE 8

Following the same procedure as Example 5, 100 parts (0.32 equivalents) of a dimethylamyldithiophosphoric acid zinc salt which has: a percent phosphorus of 10.0; a percent sulfur of 19.5; a percent zinc of 12.2; and is oil free, 50ml of methyl alcohol, 450ml of isopropyl alcohol, and 25ml of distilled water. Add 67 parts (0.32 equivalents) of 2-acrylamido-2-methylpropane sulfonic acid. After elimination of the vinyl group absorbance as measured by IR, the product has a percent nitrogen of 1.09, a percent sulfur of 4.95, a percent phosphorus of 1.54 and a percent nonvolatiles of 27%.

EXAMPLE 9

Following the procedure of Example 5, add 1192 parts (1.0 equivalent) of di(heptylphenyl)dithiophosphoric acid zinc salt which has a percent phosphorus equal to 2.6, percent sulfur equal to 5.2 and is 50% by weight in xylene, 125 parts of methyl alcohol. Add 207 parts (1.0 equivalent) of 2-acrylamido-2-methylpropane sulfonic acid. After elimination of the IR absorbance band corresponding to the vinyl group, the product has a neutralization number of 7.9, percent nitrogen of 1.23, percent sulfur of 6.2, and a percent phosphorus of 2.18.

EXAMPLE 10

Add 190 parts (0.28 equivalents) of a $diC_{14-18}$ dithiophosphoric acid having a neutralization number of 82.1, 380ml of a 50:50 mixture of isopropyl alcohol and methyl alcohol to a vessel. Add 57.6 parts (0.28 equivalents) of 2-acrylamido-2-methylpropane sulfonic acid portionwise over 8 minutes. Heat the mixture to 80° C. and hold until elimination of the vinyl band according to IR. Add 43 parts of triethanolamine and maintain the reaction temperature at 80° C. to 90° C. for 4.5 hours. Filter the reaction through diatomaceous earth to yield the product. The product has a neutralization acid number of 58.3, a percent nitrogen of 2.4, a percent phosphorus of 3.1, and a percent sulfur of 8.5.

EXAMPLE 11

Add 467 parts (0.5 equivalents) of the product of Example 1 to 45 parts (0.5 equivalents) of 2-amino-2-methyl-1-propanol. Allow the temperature to rise due to the exothermic reaction. When the exothermic reaction ceases and the reaction temperature begins to fall, filter the reaction to yield the reaction product. Reaction product has an acid number of 56.8, a percent nitrogen of 2.66, a percent sulfur of 10.20, and a percent phosphorus of 3.48.

EXAMPLE 12

Add 374 parts (0.5 equivalents) of the product of Example 2 to a vessel. Add 8.5 parts (0.5 equivalents) of ammonia gas through a precision bore over 2 hours. Allow the temperature to rise to 35°. Bubble nitrogen gas through the reaction at one standard cubic foot per hour to remove excess ammonia. The product has a neutralization number of 74.1, percent nitrogen of 3.60, percent sulfur of 12.37, and a percent phosphorus of 3.80.

Component (B-2)

In another embodiment of the invention, the catalyst is an acid; or an ester or an ammonium or metal salt of a sulfo acid represented by formula III. The sulfo compounds of Formula III are described under Component (B-1). The description of the compounds of formula III, also referred to as vinyl or allyl sulfo acids or compounds, are hereby incorporated by reference.

The ammonium salts of the vinyl or allyl sulfo compounds may be prepared from any of the amines described under component (B-1). A particularly useful ammonium salt is the salt from a vinyl or allyl sulfo compound and aminomethylpropanol. The process and amines useful in making ammonium salts described under Component (B-1) is hereby incorporated.

The metal salts are alkaline earth or transition metal salts. They are prepared from any of the alkaline earth or transitional metal compounds described under component (B-1). The preferred alkaline earth metal is zinc or magnesium with zinc more preferred. The disclosure of the process and compounds of making metal salt from Component (B-1) is hereby incorporated.

The esters of the vinyl or allyl sulfo compounds (III) may be prepared from any of the alcohols described under Component (B-1). The process of making the esters is described under Component (B-1).

The following examples illustrate how to make the catalysts (B-2).

EXAMPLE 13

Add 354 parts of water and 54 parts of zinc oxide to a suitable vessel. Add 0.05 parts of paramethoxyphenol and purge the mixture with air at a moderate rate.

Add 158 parts of 2-acrylamido-2-methylpropane sulfonic acid and 50 milliliters of water over 3 hours. Add 117 parts of 2-acrylamido-2-methylpropane sulfonic acid over 2 hours to the solution. Add 5.4 parts zinc oxide to the solution and stir for 2 hours. Filter the reaction, and the filtrate is the product.

EXAMPLE 14

Add 104 parts of 2-acrylamido-2-methylpropane sulfonic acid and 316 parts of methyl alcohol to a suitable vessel. Add 49 parts of triethylamine drop wise over one-half hour. Stir the reaction for one hour. Decant the product.

EXAMPLE 15

Add 466 parts of 2-acrylamido-2-methylpropane sulfonic acid and 1456 parts of methyl alcohol to a suitable vessel. Add 190 parts of 2-amino-2-methyl-1-propanol in portions. Filter the reaction. The filtrate is the product.

EXAMPLE 16

Add 104 parts of 2-acrylamido-2-methylpropane sulfonic acid and 301 parts of methyl alcohol to a suitable vessel. Add 44 parts of morpholine portion wise. Stir for one hour and decant the product.

Component (B-3)

In another embodiment of the present invention the catalyst is an acid, or an ammonium or metal salt of a reaction product of at least one amine and the sulfo compound (B-2). The reaction is the addition of an amine across an activated double bond. The reaction is commonly known as a Michael addition and is known to those skilled in the art. The reaction product which is formed may be (1) all Michael addition adduct, or (2) mixtures of the Michael addition adduct and the ammonium salt of the sulfo compound. Preferably the product prepared by the reaction is a mixture of ammonium salt and Michael addition adduct.

The reaction occurs between a primary or secondary amine and a vinyl or allyl sulfo compound. The temperature of the reaction is between about 30° to about 80° C., preferably about 40° to about 70° C., and preferably about 50° to about 65° C. A weak basic catalyst may be utilized, such as a trialkylamine catalyst.

The vinyl or allyl sulfo compounds useful in preparing the reaction products of (B-3) are those sulfo compounds disclosed and described under component (B-1) and are represented by formula III. The description of sulfo compounds represented by formula III is hereby incorporated. The preferred sulfo compound is an acrylamido alkane sulfonic acid, preferably 2-acrylamido-2-methylpropane sulfonic acid.

The amine useful in preparing the reaction product may be any of those primary or secondary amines described above under component (B-1) or component (B-2). Preferably, the amine is an alkanol amine or an alkyl amine. More preferably, the alkanol amine is triethanol amine, diethanol amine or amino-2-methylpropanol with amino-2-methylpropanol more preferred. Preferred alkyl amines are ethyl amine, diethyl amine, butyl amine or dibutyl amine.

The catalyst (B-3) may be an acid, or an ammonium or metal salt of a reaction product of at least one amine and the sulfo compound (B-2). The (B-3) may also be a mixture of acid, ammonium or metal salt. It has been found that the addition of the amine across the double bond of the sulfo compound may not be a reaction that proceeds to completion. Often, the product contains both Michael addition adduct as well as ammonium salt of the sulfo compound as represented by formula III. It is preferred that the reaction product contains at least some portion of double bond contributed by the sulfo compound. Preferably, the amount of sulfo compound, having a double bond, is from about 10 to about 90, preferably 20 to about 85, preferably 30 to about 80% by weight. In a preferred embodiment the reaction product contains greater than 50% by weight unsaturated sulfo compounds, preferably from 55% to about 95%, preferably 60% to about 85%.

The following examples illustrate the preparation of (B-3).

EXAMPLE 17

Methanol (350 parts) and 2-amino-2-methylpropanol (46.8 parts) are added to a vessel. Three to four crystals of paramethoxyphenol are added to the vessel. The fluid in the vessel has a pH of greater than 9 by pH paper. To the vessel is added 2-acrylamido-2-methylpropane sulfonic acid (104 parts) over 24 minutes. The reaction temperature increases from 21° C. to about 31° C. The reaction is heated to reflux at about 60° C. and the temperature is maintained for 8 hours. Potassium hydroxide (0.35 parts) is added to the reaction mixture, and the mixture is maintained at reflux for about 5 hours. The product is a yellow liquid which has a specific gravity of 0.877 at 15.6° C. and reveals by proton nuclear magnetic resonance (NMR) that a maximum of 31 mole percent of the reaction mixture is the Michael addition adduct.

EXAMPLE 18

Isopropanol alcohol (128 parts), a 50:50 mixture of isopropyl isobutyl alcohol (225 parts), and 2-acrylamido-2-methylpropane sulfonic acid (104 parts) are added to a suitable vessel. Triethyl amine (51 parts) is added dropwise. The temperature of the reaction increases from 21° C. to 37° C. Amino-2-methylpropanol (47 parts) is added. The reaction is heated to reflux at 95° C. for 2 hours. The infrared spectrum of the reaction product revealed no double bond absorption at 6.2 microns. The reaction is heated to reflux and held for an additional 5.5 hours.

Component (C)

As stated previously the aminoplast resin may be cured by itself to form a desired coating. However, the aminoplast resin may be reacted with an aminoplast co-reactant which imparts useful properties to the cured and curing resin. The aminoplast co-reactant is an agent which is reactive with the aminoplast resin. The co-reactant usually is a thermosetting resin, a polyfunctional acid or anhydride, polyfunctional amine and polyhydric alcohol. The thermosetting resin is preferably not an aminoplast resin.

When the co-reactant is a thermosetting resin, it has a number average molecular weight of at least about 300, preferably about 500 to about 50,000, most preferably about 1000 to about 10,000. Among the preferred resins are epoxy resins, acrylic resins, unsaturated polyester resins, alkyd resins, phenolic resins, allyl resins, furan resins, silicone resins, or a mixture of two or more of said resins.

The epoxy resins useful in the present invention include any one of a number of well-known organic resins which are characterized by the presence therein of the epoxide group

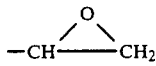

A wide variety of such resins are available commercially. Such resins have either a mixed aliphatic-aromatic or an exclusively non-aromatic (i.e., aliphatic or cycloaliphatic) molecular structure.

The mixed aliphatic-aromatic epoxy resins which are useful with the present invention are prepared by the well-known reaction of a bis(hydroxy-aromatic)alkane or a tetrakis-(hydroxyaromatic)-alkane with a halogen-substituted aliphatic epoxide, usually epichlorohydrin, in the presence of a base such as, e.g., sodium hydroxide or potassium hydroxide. Under these conditions, hydrogen halide is first eliminated and the aliphatic epoxide group is coupled to the aromatic nucleus via an ether linkage. Then the epoxide groups condense with the hydroxyl groups to form polymeric molecules which vary in size according to the relative proportions of reactants and the reaction time.

In lieu of the epichlorohydrin, one can use halogen-substituted aliphatic epoxides containing about 4 or more carbon atoms, generally about 4 to about 20 carbon atoms. In general, it is preferred to use a chlorine substituted terminal alkylene oxide (terminal denoting that the epoxide group is on the end of the alkyl chain) and a particular preference is expressed for epichlorohydrin by reason of its commercial availability and excellence in forming epoxy resins useful for the purpose of this invention.

If desired, the halogen substituted aliphatic epoxide may also contain substituents such as, e.g., hydroxy keto, nitro, nitroso, ether, sulfide, carboalkoxy, etc.

One can use bis-(hydroxyaromatic)alkanes containing about 16 or more carbon atoms, generally about 16 to about 30 carbon atoms such as, e.g., 2,2-bis(1-hydroxy-4-naphthyl)propane; 2,2-bis(0-hydroxyphenyl)propane; 2,2-bis(p-hydroxyphenyl)butane, or 3,3-bis(p-hydroxyphenyl)hexane; and the like. If desired, the bis(hydroxyaromatic)alkane may contain substituents such as, e.g., halogen, nitro, nitroso, ether, sulfide, carboalkoxy, etc. In general, it is preferred to use a bis(p-hydroxyphenyl)alkane since compounds of this type are readily available from the well-known condensation of phenols with aliphatic ketones or aldehydes in the presence of a dehydrating agent such as sulfuric acid. Particularly preferred is 2,2-bis-(p-hydroxyphenyl)propane, which is available commercially as "Bisphenol A".

Epoxy resins which are especially suited for the purpose of the present invention are prepared by the reaction of bis-(hydroxyphenyl)alkane, preferably 2,2-bis-(p-hydroxyphenyl)propane with a chlorine substituted terminal alkylene oxide, preferably epichlorohydrin, to produce a product having an average molecular weight within the range of about 300 to about 500 and preferably about 350 to about 400. One of such preferred epoxy resins having an average molecular weight of about 380 and prepared from 2,2-bis-(p-hydroxyphenyl)propane and epichlorohydrin is known by the trade designation "Epon 1031".

Another general class of epoxy resins which are useful for the purpose of the present invention are the aliphatic or cycloaliphatic epoxy resins. These resins, which are cyclic or acyclic olefins such as, e.g., methylcyclohexane, vinylcyclohexene, alphamethyl-vinylcyclohexene, polybutadiene, etc., which contain at least one carbon-to-carbon multiple bond. One of such non-aromatic epoxy resins, known by the trade designation "Oxiron 2001", is made by oxidizing polybutadiene with peracetic acid.

Still another class of epoxy resins which are useful for the purposes of the present invention are the novolak resins. Representative of the novolak resins are the phenol novolak and cresol novolak resins.

The acrylic resins are obtained by polymerizing a suitable combination of a functional group-containing monomer and another copolymerizable monomer in an ordinary manner. The polymerization temperature is ordinarily between about 60° C. and about 100° C., and polymerization time is usually within a range of about 3 to about 10 hours. Examples of the functional group-containing monomers include hydroxyl group-containing monomers such as beta-hydroxyethyl acrylate, beta-hydroxypropyl acrylate, beta-hydroxyethyl methacrylate, beta-hydroxypropyl methacrylate, N-methylol acrylamide and N-methylol methacrylamide; carboxyl group-containing monomers such as acrylic acid, methacrylic acid, itaconic acid, maleic acid, fumaric acid, as well as monoesters of maleic acid and fumaric acid with monoalcohols; alkoxyl group-containing monomers such as N-butoxy-methylmethacrylamide and N-butoxy-methylacrylamide; and epoxy group-containing monomers such as glycidyl methacrylate, glycidyl acrylate and allyl glycidyl ether. These monomers may be used either alone or in the form of a combination of two or more of them. The functional group-containing monomer is used in an amount of about 5 to about 40% by weight of total monomers. Examples of the monomers copolymerized with these functional group-containing monomers include olefinically unsaturated monomers such as ethylene, propylene and isobutylene; aromatic monomers such as styrene, vinyltoluene and alphamethylstyrene; ester of (meth)acrylic acid and alcohols of 1 to about 18 carbon atoms such as methyl(meth)acrylate, ethyl(meth)acrylate, propyl(meth)acrylate, n-butyl(meth)acrylate, isobutyl(meth)acrylate, cyclohexyl(meth)acrylate, 2-ethylhexyl(meth)acrylate and lauryl(meth)acrylate; vinyl esters of carboxylic acid of about 2 to about 11 carbon atoms such as vinyl acetate, vinyl propionate and vinyl 2-ethylhexylic acid; as well as vinyl chloride, acrylonitrile and methacrylonitrile. The notation (meth)acrylic is meant to cover acrylic as well as methacrylic structures. For instance, methyl(meth)acrylate is meant to cover methylacrylate as well as methylmethacrylate. They may be used either alone or in the form of a mixture of two or more of them.

The unsaturated polyesters are characterized by vinyl unsaturation in the polyester backbone. These unsaturated polyesters are obtained by polymerizing polycarboxylic acids or anhydrides with polyhydric alcohols using known methods. Examples of the polycarboxylic acids include terephthalic acid, isophthalic acid, phthalic anhydride, hexahydrophthalic anhydride, fumaric acid, trimellitic anhydride, maleic anhydride, phthalic anhydride, and succinic anhydride. Examples of the polyhydric alcohols include ethylene glycol, propylene glycol, diethylene glycol, glycerol, trimethylol propane, trimethylol ethane, pentaerythritol and bisphenol A.

The alkyd resins are obtained by reacting a dihydric or polyhydric alcohol and a polybasic acid or anhydride in the presence of a drying oil using known techniques. Examples of the dihydric or polyhydric alcohols include glycerol, pentaerythritol, sorbitol and diethylene glycol. Examples of the polybasic acids or anhydrides include phthalic acid, isophthalic acid, maleic anhydride, fumaric anhydride, nonconjugated linoleic acid, oleic acid, adipic acid, azelaic acid, sebacic acid, tetrachlorophthalic anhydride, and chlorendic anhydride. Examples of the drying oils include soybean oil, linseed oil, dehydrated castor oil, non-oxidizing castor and coconut oils, tung oil, oiticica oil, fish oil, sunflower oil, walnut oil, safflower seed oil and tall oil. These alkyd resins may be produced, for example, by direct fusion of glycerol, phthalic anhydride and drying oil at a temperature in the range of from about 210° C. to about 235° C. Solvents are then added to adjust the solids content. The amount of drying oil varies depending on the intended use. With respect to the high solids compositions of the invention, the level of drying oil is preferably minimized.

The phenolic resins are any of the several types of synthetic thermosetting resins made by reacting a phenol with an aldehyde. Examples of the phenols include phenol, cresols, xylenols, p-t-butyl phenol, p-phenyl phenol, bis-phenols and resorcinol. Examples of the aldehydes include formaldehyde, acetaldehyde and furfural. Phenol-formaldehyde resins are a preferred class of such phenolic resins.

The allyl resins are formed by the addition polymerization of compounds containing the group $CH_2=CHCH_2—$, such as esters of allyl alcohol and dibasic acids. Generally, they are commercially available as monomers and partially polymerized prepolymers. Examples of such allyl resins include diallyl phthalate, diallyl isophthalate, diallyl maleate and diallyl chlorendate.

The furan resins are obtained primarily by the condensation polymerization of furfuryl alcohol in the presence of strong acids, sometimes in combination with formaldehyde or furfurylaldehyde. These furan resins also include resins made by condensing phanol and furfuryl alcohol or furfuryl, and furfuryl-ketone polymers.

The silicone resins are a family of semiorganic polymers comprising chains of alternating silicon and oxygen atoms, modified with various organic groups attached to the silicon atoms. Examples of such silicone resins include dimethyl polysiloxanes made by treating silicon with methyl chloride in the presence of a catalyst to form a chlorosilane, hydrolyzing this chlorosilane to form a cyclic trimer of siloxane, then polymerizing the siloxane to form a dimethyl polysiloxane. Modifications of dimethyl polysiloxane that are useful include those made by the incorporation of phenyl groups, halogen atoms, alkyds, epoxides, polyesters and other organic compounds containing OH groups.

The polyfunctional acids or anhydrides include those materials containing two or more equivalents of a carboxyl group or acid anhydride thereof in the molecule. Examples include polyvalent carboxylic acid or anhydride compounds such as phthalic anhydride, isophthalic acid, adipic acid, succinic acid, sebacic acid, citric acid, itaconic acid, aconitic acid, maleic anhydride, fumaric acid, trimellitic anhydride, hexahydrophthalic acid, tetrahydrophthalic anhydride, dodecenyl succinic anhydride, pimelic acid, pyromellitic anhydride, and polyester resins having two or more carboxyl groups in the molecule which are obtained by esterification of these polyvalent carboxylic acid compounds with polyhydric alcohols.

The polyfunctional amines include those compounds which contain two or more nitrogen atoms having one or two hydrogen atoms. These polyfunctional amines can be aliphatic, cycloaliphatic, heterocyclic or aromatic polyamines.

A group of amines suitable for use as a coreactant are hydrazine and substituted-hydrazine. Both of the nitrogens in the hydrazine used must contain at least one hydrogen directly bonded thereto. The substituents which may be present on the hydroazine include alkyl, alkenyl, aryl, aralkyl, alkaryl, and the like. Usually, the substituents are alkyl, especially lower alkyl, phenyl, and substituted phenyl such as lower alkoxy substituted phenyl or lower alkyl substituted phenyl. Specific examples of substituted hydrazines are methylhydrazine, N,N'-dimethylhydrazine, phenylhydrazine, N-phenyl-N'-ethylhydrazine, N,N'-di(parachlorophenol)hydrazine, N-phenyl-N'-cyclohexylhydrazine, and the like.

Another group of amines suitable for use as the coreactants are branched polyalkylene polyamines. The branched polyalkylene poly amines are polyalkylene polyamines wherein the branched group is a side chain containing on the average at least one nitrogen-bonded aminoalkylene group per nine amino units present on the main chain, for examples, 1–4 of such branched chains per nine units of the main chain, but preferably one side chain unit per nine main chain units. Thus, these polyamines contain at least three primary amino groups and at least one tertiary amino group.

Branched polyalkylene polyamines are available commercially and sold as Polyamines N-400, N-800, N-1200, etc. Polyamine N-400 has the above formula wherein $n=1$.

U.S. Pat. Nos. 3,200,106 and 3,259,578 are expressly incorporated herein by reference for their disclosure of how to make such polyamines.

Suitable amines also include polyoxyalkylene polyamines, e.g., polyoxyalkylene diamines and polyoxyalkylene triamines, having average molecular weights ranging from about 200 to about 4000 and preferably from about 400 to about 2000. Examples of these polyoxyalkylene polyamines may be characterized by the formulae:

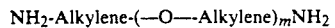

$NH_2$-Alkylene-($—O—$-Alkylene)$_m NH_2$ where m has a value of about 3 to about 70 and preferably about 10 to about 35.

R$_7$-Alkylene-(—O—Alkylene)$_n$NH$_2$ where n is such that the total value is from about 1 to 40 with the proviso that the sum of all of the n's is from about 3 to about 70 and generally from about 6 to about 35 and R$_7$ is a saturated hydrocarbon radical of up to 10 carbon atoms. The alkylene groups may be straight or branched chains and contain from 1 to 7 carbon atoms, and usually from 1 to 4 carbon atoms. The various alkylene groups may be the same or different.

Preferred polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-250, D-400, D-1000, D-2000, T-403, etc."

U.S. Pat. Nos. 3,804,763 and 3,948,800 are expressly incorporated herein by reference for their disclosure of such polyoxyalkylene polyamines.

Preferred amines for use as co-reactants are the alkylene polyamines, including the polyalkylene polyamines, as described above under Component (B), that disclosure is hereby incorporated by reference.

The polyhydric alcohols can be represented by the formula

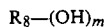
R$_8$—(OH)$_m$ wherein R$_8$ is a or polyvalent hydrocarbyl group and m is an integer of at least 2, preferably 2 to 10, more preferably 2 to about 4. These alcohols can be aliphatic, cycloaliphatic, aromatic, and heterocyclic, including aliphatic-substituted cycloaliphatic alcohols, aliphatic-substituted aromatic alcohols, aliphatic-substituted heterocyclic alcohols, cycloaliphatic-substituted aromatic alcohols, cycloaliphatic-substituted heterocyclic alcohols, heterocyclic-substituted aliphatic alcohols, heterocyclic-substituted cycloaliphatic alcohols, and heterocyclic-substituted aromatic alcohols. Except for the polyoxyalkylene alcohols, the polyhydric alcohols corresponding to the formula R$_8$—(OH)$_m$ will usually contain not more than about 40 carbon atoms and generally not more than about 20 carbon atoms. The alcohols may contain non-hydrocarbon substituents which do not interfere with the reaction of the alcohols with the aminoplast resin.

Among the polyoxyalkylene alcohols suitable for use herein are those polyols prepared as "block" copolymers. Thus, a hydroxy-substituted compound, R$_8$—(OH)$_q$ (where q is 1 to 6, preferably 2 to 3, and R$_8$, as defined above, is reacted with an alkylene oxide,

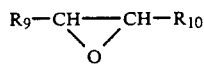
R$_9$—CH——CH—R$_{10}$
\\O/ to form a hydrophobic base, R$_9$ being a lower alkyl group of up to 4 carbon atoms, R$_{10}$ being H or the same as R$_9$ with the proviso that the alkylene oxide does not contain in excess of 10 carbon atoms. This base is then reacted with ethylene oxide to provide a hydrophilic portion resulting in a molecule having both hydrophobic and hydrophilic portions. The relative sizes of these portions can be adjusted by regulating the ratio of reactants, time of reaction, etc., as is obvious to those skilled in the art.

Examples of the polyhydric alcohols are those containing from 2 to about 10 hydroxy groups. These are illustrated, for example, by the alkylene glycols and polyoxyalkylene glycols such as ethylene glycol, diethylene glycol, triethylene glycol, tetraethylene glycol, dipropylene glycol, tripropylene glycol, dibutylene glycol, tributylene glycol, and other alkylene glycols and polyoxyalkylene glycols in which the alkylene radicals contain 2 to about 8 carbon atoms.

A preferred class of alcohols suitable for use in this invention are those polyhydric alcohols containing up to about 12 carbon atoms. This class of alcohols includes glycerol, erythritol, pentaerythritol, dipentaerythritol, gluconic acid, glyceraldehyde, glucose, arabinose, 1,7-heptanediol, 2,4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, quinic acid, 2,2,6,6-tetrakis(hydroxymethyl)cyclohexanol, 1,10-decanediol, digitalose, and the like.

Another preferred class of polyhydric alcohols for use in this invention are the polyhydric alkanols containing 3 to 10 carbon atoms and particularly those containing 3 to 6 carbon atoms and having at least three hydroxyl groups. Such alcohols are exemplified by glycerol, erythritol, pentaerythritol, mannitol, sorbitol, 2-hydroxymethyl-2-methyl-1,3-propanediol(trimethylolpropane), 1,2,4-hexanetriol, and the like. Glycerol, pentaerythritol and sorbitol are preferred with pentaerythritol more preferred.

Other co-reactants that are useful include compounds containing two or more epoxy groups per molecule. Examples include polyvalent epoxy compounds obtained by the condensation of bisphenol A and epichlorohydrin or beta-methylepichlorohydrin, polyvalent epoxy compounds obtained by the condensation of novolak or resol and epichlorohydrin; diepoxy compounds having a polyether in the skeleton and alicyclic epoxy compounds.

Curable Compositions

The curable compositions of the present invention are useful in coatings applications as well as plastics applications.

The curable compositions may be used in any coatings applications where a metallic surface is covered with a composition and that composition is heated until a cured coating is formed. Automobile parts, appliance, furniture such as filing cabinets, etc., are examples of materials where the curable compositions may form effective coatings.

For coatings, the surface of the article, preferably metal, is covered with the curable composition. The composition may be brushed, poured, sprayed, or otherwise placed onto the surface of the article to be coated. Spraying is the preferred method. The composition is normally allowed to air dry for about 3 to about 15 minutes. Then the article with the composition is placed in an oven at a temperature of about 80° C. to about 200° C., preferably about 175° C. for about 15 to about 60 minutes, preferably about 30 minutes.

For plastics, the curable compositions are placed into molds and heated to a temperature suitable to affect curing of the resin. The curable compositions may also contain other additives, such as binders, fillers, mold release agents, etc., which are known to those in the art.

In the curable composition, (A) the aminoplast resin is present in an amount from about 4% to about 30% by weight of the curable composition, more preferably about 5% to about 25%, and more preferably about 6% to about 15%; (B) the catalyst is present in an amount from about 0.01 to about 10% by weight of the resin more preferably about 0.1% to about 5%, and more preferably from about 0.5% to about 2%. The weight of the resin includes the aminoplast resin and the aminoplast coreactant, if present. When the aminoplast coreactant (C) is present in an amount from 0–90%, preferably 20% to 85%, by weight of the resin. In a preferred embodiment, the aminoplast coreactant (C) is present from about 50 to about 90, preferably about 70 to about 85, of the resin. The aminoplast resin is present from about 10 to about 50, preferably about 15 to about 30% by weight of the resin. A particularly useful composition is about 80% aminoplast coreactant and about 20% aminoplast resin.

Component (D)

The curable compositions of the present invention may also include an overbased metal composition (D). (D) provides beneficial thixotropic properties to the compositions. (D) acts to control sagging of the composition as it is heated during curing.

The overbased metal composition (D) may be used with the aminoplast resin (A) and the catalyst (B). (D) may also be used with (A), (B) and the coreactant (C).

The overbased metal compositions which may be included in the compositions of the present invention are known to those in the art. They include overbased compositions as well as gelled overbased compositions which are commonly referred to as non-Newtonian Colloids disperse systems.

Overbased metal salts commonly are salts of sulfonic, carboxylic, as well as phenols. The phenols may be coupled as well as substituted. Preferably, the acid is a sulfonic acid. Specifically, alkyl benzene sulfonic acids have been found to be particularly useful. Sulfonic acids useful in preparing the overbased and gelled overbased salts of the present invention are known to those in the art.

The metals useful in preparing the overbased composition are alkali, alkaline earth and transitional metals. Preferably, the metals are alkali or alkaline earth metals. In a preferred embodiment the metal of the overbased salt is an alkaline earth metal, specifically calcium, barium or magnesium with calcium preferred.

A term useful in describing the quantity of metal present in an overbased salt is by use of the term metal ratio. The metal ratio is defined as the ratio of the equivalents of metal per equivalent of acid. For instance, an overbased calcium sulfonate having a metal ratio of 40 would have 40 times the equivalent of calcium present versus the equivalents of of sulfonic acid.

The overbased materials preferably have a metal ratio of at least 3.5 and preferably at least about 4.5. A preferred group of overbased materials has a metal ratio of at least about 7. While overbased materials having a metal ratio of up to about 75 can be used, normally the maximum metal ratio will not exceed about 30 or, in most cases, not more than about 20.

The gelled overbased salts, often referred to as non-Newtonian disperse systems are prepared by treating an overbased salt with a conversion agent. The conversion agents include but are not limited to lower aliphatic carboxylic acids, water, aliphatic alcohols, cycloaliphatic alcohols, arylaliphatic alcohols, phenols, ketones, aldehydes, amines, boric acids, phosphorus acids, and carbon dioxide. Mixtures of two or more of these conversion agents are also useful.

U.S. Pat. No. 4,591,612 issued May 27, 1986 to Quinn is hereby incorporated by reference for its disclosure to overbased metal salts (Newtonian systems) and gelled overbased metal salts (non-Newtonian colloidal disperse systems). U.S. Pat. No. 4,591,612 is also incorporated herein by reference for its disclosure to the preparation of overbased and gelled overbased metal salts.

In the curable coating compositions of the present invention, (D) the overbased metal composition is present in an amount from about 0.1% to about 15% of the curable composition, preferably about 0.3% to about 6%, more preferably about 0.4% to about 3%.

The following examples relate to overbased metal compositions (D).

EXAMPLE 19

3185 parts of methanol, 28.25 parts of calcium chloride and 226.5 parts of tap water are added to a glass-lined reactor equipped with a heating mantle, thermocouple, metal stirrer, gas inlet tube and condenser. The mixture is heated to 48° C. with stirring. 644.5 parts of Silo lime (94% calcium hydroxide) are to the mixture to provide a slurry. The temperature of the mixture is reduced to 45° C. 7075 parts of polypropylene (MW=337) substituted benzene sulfonic acid are added to the mixture over a period of one hour. The temperature of the mixture exotherms to 46° C. The mixture is stirred for one-half hour. 6275 parts of SC Solvent 100 (a high-boiling alkylated aromatic solvent supplied by Ohio Solvents) are added to the mixture and the mixture is stirred for 15 minutes. Three increments of 1772.75 parts of Silo lime are added to the mixture. Carbon dioxide at a rate of five standard cubic feet per hour is bubbled through the mixture after each increment. Total blowing with carbon dioxide is approximately 10.5 hours with the temperature of the mixture varying from 40° C. to 50° C. The mixture is stripped with nitrogen blowing at a rate of two standard cubic feet per hour while heating to reflux over a nine-hour period, the temperature increasing over said period from 47° C. to 160° C. The mixture is cooled to room temperature. The mixture is filtered through a Gyro Tester clarifier. The solids content is adjusted to 70% solids with SC Solvent 100.

EXAMPLE 20

15,000 parts of the product of Example 23 are placed in a glass-lined reactor equipped with a heating mantle, thermocouple, gas inlet tube, condenser and metal stirrer, and heated to 40° C. with stirring. Carbon dioxide is bubbled through the mixture at a rate of one cubic foot per hour for 3.75 hours, the temperature of the mixture varying from 38° C. to 46° C. during the carbon dioxide blowing. 847.8 parts of isopropyl alcohol, 847.8 parts of methanol and 1304 parts of distilled water are added to the mixture over a five-minute period. The mixture exotherms to 45° C., and is then heated to 67° C. 2500 parts of SC Solvent 100 are added to the mixture. The mixture is heated to 78° C. and maintained at said temperature for 0.5 hour. The mixture is stripped by bubbling nitrogen at a rate of two standard cubic feet per hour through the mixture over a period of 5.5 hours, the temperature of the mixture increasing from 77° C. to 155° C. during stripping. The mixture is cooled with cooling water, and 16,700 parts of a gelled product having a solids content of 62.5% by weight are obtained.

EXAMPLE 21

1200 parts of the product of Example 24 are placed in a resin reactor equipped with a heating mantle, metal stirrer, teflon bearing, gas inlet tube, thermocouple, trap and condenser. 225.5 parts of polypropylene (MW=337) substituted benzene sulfonic acid are added to the mixture over a 10-minute period, and the mixture exotherms to 34° C. for 20 minutes. Water is tripped from the mixture by bubbling nitrogen at a rate of two standard cubic feet per hour through the mixture. The trap is filled with SC Solvent 100 to prevent solvent loss. The temperature increases to 162° C. over a two-hour period during stripping. The temperature is then maintained at 162° C. for 0.5 hour. 7.5 cubic centimeters of water are collected. The mixture is cooled to room temperature, and 1413 parts of a low oil overbased sulfonate gel with a zero base number are obtained.

Examples I-V relate to curable compositions of the present invention.

EXAMPLE I

Mix 1.2 parts of the product of Example 5 and 98.8 parts of a master paint formulation which is formed from: 8.3 parts Cargill Polyester 5770, 35.3 parts $TiO_2$ R-900, 3.4 parts Methyl Ethyl Ketone, 3.9 parts Butyl Cellosolve, and 1.6 parts Cellosolve Acetate, which are together ground until the mixture has a pasty consistency and a 7 Hegman rating. The paste is then further mixed with 28.1 parts Cargill Polyester 5770, 13.3 parts Cymel 303, 5.7 Cellosolve Acetate, and 0.4 parts 5.1 wet C-7605 (50% in Butyl Cellosolve).

EXAMPLE II

Mix 1.2 parts of the product of Example 15 and 98.8 parts of a master paint formulation which is formed from: 8.3 parts Cargill Polyester 5770, 35.3 parts $TiO_2$ R-900, 3.4 parts Methyl Ethyl Ketone, 3.9 parts Butyl Cellosolve, and 1.6 parts Cellosolve Acetate, which are together ground until the mixture has a pasty consistency and a 7 Hegman rating. The paste is then further mixed with 28.1 parts Cargill Polyester 5770, 13.3 parts Cymel 303, 5.7 parts Cellosolve Acetate, and 0.4 parts Silwet L-7605, (50% in Butyl Cellosolve).

EXAMPLE III

Grind 15.73 parts Aquamac 1300, 1.02 parts Dimethyethanolamine, 15.73 parts water, and 20.98 parts $TiO_2$, to form a paste with a Hegman rating of 7H. Add with mixing 15.73 parts Aquamac 1300, 7.34 parts Cymel 303, 0.94 parts Dimethyethanolamine, 18.73 parts water, 2.09 parts Butyl Cellosolve, 1.05 parts n-Butanol, and 0.66 parts of the product of Example 5.

EXAMPLE IV

Grind 15.75 parts Aquamac 1300, 1.02 parts Dimethyethanolamine, 15.75 parts water, and 21.00 parts $TiO_2$, to form a past with a Hegman rating of 7H. Add 15.75 parts Aquamac 1300, 7.35 parts Cymel 303, 0.94 parts Dimethyethanolamine, 18.76 parts water, 2.10 parts Butyl Cellosolve, 1.05 parts N-Butanol and 0.53 parts of the product of Example 15.

EXAMPLE V

Mix 1000 parts of Acryloid AT-400 (a polyacrylate from Rohm & Haas), 250 parts of Cymel 303, 400 parts of n-butanol and 23.4 parts of a gelled overbased calcium petroleum sulfonate. Mix 99.5 parts of the above mixture and 0.5 parts of the product of Example 5.

In the following test, cured compositions are prepared by spraying the composition of one of Examples I-V onto a metal panel. The panel is allowed to air dry for 5 minutes. The panel is next placed in a suitable oven at 350° F. for about 30 minutes. The coated panel is then tested for knoop hardness units.

Knoop hardness of the films was determined on an ATS Micro Hardness Tester (Model MHT-1). A coated panel was fixed to the testing platform with double sided tape, and the film scribed with a diamond indenter for 18 seconds using a 10 gram weight. The long diagonal of the diamond shape scribe was then measured under 400× magnification using the instruments micrometer. Micrometer readings were then converted to knoop units using the following equation:

$$KU = \frac{0.1423}{\left(\frac{\text{micrometer reading}}{1000}\right)^2}$$

The following Table lists film hardness values obtained from coating compositions of Examples I-IV.

TABLE

|  | Knoop Hardness |
| --- | --- |
| Example I | 11.8 |
| Example II | 9.4 |
| Example III | 8.7 |
| Example IV | 14.9 |

As can be seen from the above Table, the catalyst of the present invention are useful in making coatings with good Knoop hardness values.

We claim:

1. A curable composition comprising:
   (A) at least one aminoplast resin; and
   (B) an amount effective to cure the composition of at least one catalyst selected from the group consisting of
   (B-1) an acid, or an anhydride, ester, ammonium salt or metal salt of the acid that is represented by one of the formulae

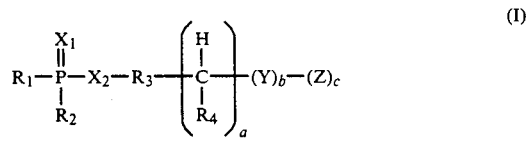

(I)

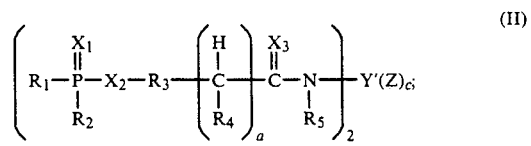

(II)

(B-2) an acid, or an ester, a metal salt or ammonium salt of a sulfo compound represented by the formula:

(III)

(B-3) an acid, or an ammonium or metal salt of a reaction product of at least one amine and the sulfo compound of (B-2); and mixtures thereof;
where in Formulae I and II
$R_1$ and $R_2$ are each independently hydrocarbyl or hydrocarbyloxy or hydrocarbylthio groups;
where in Formulae I, II and III
each $X_1$ and $X_2$ is independently sulfur or oxygen;
$R_3$ is a divalent hydrocarbyl group,
each $R_4$ and $R_5$ is independently a hydrogen or hydrocarbyl group;
a is 0 or 1;
b is 0 or 1;
c is 1 or 2;
Y is a divalent or trivalent hydrocarbyl group or $-C(X_3)NR_5Y'$;
$X_3$ is sulfur or oxygen;
Y' is a divalent, trivalent or tetravalent hydrocarbyl group provided that Y' is not divalent in Formula II;
Z is $-S(O)OH$, or $-S(O)_2OH$.

2. The composition of claim 1 wherein each $R_1$ and $R_2$ is independently a hydrocarbyl or hydrocarbyloxy group having from 1 to about 30 carbon atoms; wherein $X_1$ and $X_2$ are sulfur; wherein each $R_4$ and $R_5$ is independently hydrogen or alkyl having from 1 to about 12 carbon atoms; wherein Y is an arylene group having from 6 to about 18 carbon atoms, an alkylene or alkylidene group having from 1 to about 18 carbon atoms, or $-C(X_3)NR_5Y'$ and wherein $X_3$ is oxygen.

3. The composition of claim 2, wherein Y is $-C(X_3)NR_5Y'$.

4. The composition of claim 1 wherein the ester contains less than about 12 carbon atoms in the ester group; wherein the ammonium salt is formed from at least one nitrogen compound selected from the group consisting of ammonia, a monoamine and a polyamine; wherein the metal of the metal salt is an alkaline earth or a transition metal.

5. The composition of claim 1 wherein the aminoplast resin is a melamine-formaldehyde resin or a urea-formaldehyde resin.

6. The composition of claim 1 wherein the catalyst (B) is (B-1).

7. The composition of claim 6 wherein each $R_1$ and $R_2$ is independently a hydrocarbyl or hydrocarbyloxy group having from 1 to about 30 carbon atoms; wherein $X_1$ and $X_2$ are sulfur; wherein each $R_4$ and $R_5$ is independently hydrogen or alkyl having from 1 to about 12 carbon atoms; wherein Y is an arylene group having from 6 to about 18 carbon atoms, an alkylene or alkylidene group having from 1 to about 18 carbon atoms, or $-C(X_3)NR_5Y'$ and wherein $X_3$ is oxygen.

8. The composition of claim 6 wherein each $R_1$ and $R_2$ is independently an alkoxy or aryloxy group.

9. The composition of claim 6, wherein (B-1) is an acid.

10. The composition of claim 6 wherein (B-1) is an ester containing less than about 12 carbon atoms in the ester group.

11. The composition of claim 6 wherein (B-1) is an ammonium salt formed from at least one nitrogen compound selected from the group consisting of ammonia, a monoamine and a polyamine.

12. The composition of claim 11 wherein the nitrogen compound is a monoamine having from 1 to about 24 carbon atoms.

13. The composition of claim 11 wherein the nitrogen compound is a polyalkylene polyamine.

14. The composition of claim 12 wherein the monoamine is an alkanolamine.

15. The composition of claim 12 wherein the monoamine is an alkylamine having from 1 to about 7 carbon atoms.

16. The composition of claim 6 wherein (B-1) is a metal salt wherein the metal of the metal salt is an alkaline earth or a transition metal.

17. The composition of claim 16 wherein the metal is calcium, magnesium, manganese, iron, cobalt, nickel, or zinc.

18. The composition of claim 16 wherein the metal is zinc.

19. The composition of claim 1 wherein the catalyst (B) is the sulfo compound (B-2).

20. The composition of claim 19 wherein each $R_4$ and $R_5$ is independently hydrogen or alkyl having from 1 to about 12 carbon atoms; Y is an arylene group having from 6 to about 18 carbon atoms, an alkylene or alkylidene group having from 1 to about 18 carbon atoms, or $-C(X_3)NR_5Y'$ and $X_3$ is oxygen.

21. The composition of claim 19 wherein Y is $-C(X_3)NR_5Y'$.

22. The composition of claim 19, wherein (B-2) is an ester having less than about 12 carbon atoms in the ester group.

23. The composition of claim 19, wherein (B-2) is an acid.

24. The composition of claim 19, wherein (B-2) is an ammonium salt formed from at least one nitrogen compound selected from the group consisting of ammonia, a monoamine and a polyamine.

25. The composition of claim 24, wherein the nitrogen compound is a monoamine having from 1 to about 24 carbon atoms.

26. The composition of claim 25, wherein the nitrogen compound is an alkanolamine or alkylamine having less than 7 carbon atoms.

27. The composition of claim 25, wherein the monoamine is aminomethylpropanol, diethanol amine or triethanol amine.

28. The composition of claim 25, wherein the monoamine is aminomethylpropanol.

29. The composition of claim 24, wherein the nitrogen compound is a polyamine which is a polyalkylene polyamine.

30. The composition of claim 19, wherein (B-2) is a metal salt, wherein the metal of the metal salt is an alkaline earth or a transition metal.

31. The composition of claim 19, wherein the metal of the metal salt is calcium, magnesium or zinc.

32. The composition of claim 1 wherein the catalyst (B) is (B-3) the acid, or ammonium or metal salt of the reaction product.

33. The composition of claim 32 wherein Y is an arylene group having from 6 to about 18 carbon atoms, an alkylene or alkylidene group having from 1 to about 18 carbon atoms, or $-C(X_3)NR_5Y'$ and $X_3$ is oxygen.

34. The composition of claim 32, wherein Y is $-C(X_3)NR_5Y'$.

35. The composition of claim 32, wherein the amine used to form the reaction product is at least one hydrocarbyl amine having from 1 to about 28 carbon atoms.

36. The composition of claim 32, wherein the amine used to form the reaction product is at least one alkanol amine or alkyl amine having from 1 to about 12 carbon atoms.

37. The composition of claim 32, wherein (B-3) is an acid.

38. The composition of claim 32, wherein (B-3) is an ammonium salt formed from at least one nitrogen compound selected from the group consisting of ammonia, a monoamine or a polyamine.

39. The composition of claim 38, wherein the nitrogen compound is a monoamine having from 1 to about 24 carbon atoms.

40. The composition of claim 39, wherein the monoamine is aminomethylpropanol, diethanol amine or triethanol amine.

41. The composition of claim 39, wherein the monoamine is aminomethylpropanol.

42. The composition of claim 32, wherein the nitrogen compound is a polyamine which is a polyalkylene polyamine.

43. The composition of claim 32, wherein (B-3) is a metal salt, wherein the metal of the metal salt is an alkaline earth or transition metal.

44. The composition of claim 43, wherein the metal of the metal salt is calcium, magnesium or zinc.

45. The composition of claim 1, wherein the amount of the catalyst (B) is from about 0.01 to about 10% by weight of the total composition.

46. A curable composition, comprising:
(A) at least one melamine-formaldehyde resin; and at least one catalyst selected from the group consisting of:
(B-1) from about 0.01 to about 10% by weight of the total composition of an acid, or an anhydride, ester, ammonium salt or metal salt of the acid that is represented by one of the formulae

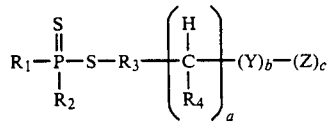  (I)

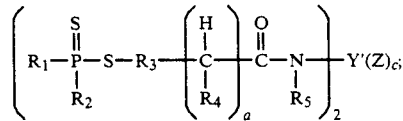  (II)

(B-2) from about 0.01 to about 10% by weight of the total composition of an acid; or an ester, a metal salt or ammonium salt of a sulfo compound represented by the formula:

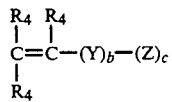  (III)

(B-3) an acid, or an ammonium or metal salt of a reaction product of at least one amine and the sulfo compound of (B-2); and mixtures thereof;
where in Formulae (I) and (II)
each $R_1$ and $R_2$ is independently a hydrocarbyl or hydrocarbyloxy or hydrocarbylthio group;
where in Formulae I, II, and III
$R_3$ is a divalent hydrocarbyl group;
each $R_4$ and $R_5$ is independently hydrogen or an alkyl group having from 1 to about 6 carbon atoms;
a is 0 or 1;
b and C are 1;

Y is $—C(O)NR_5Y'$;
in Formula I, Y' is a divalent hydrocarbyl group;
in Formula II, Y' is a trivalent hydrocarbyl group;
Z is $—S(O)OH$, or $—S(O)_2OH$.

47. The composition of claim 46, wherein the catalyst is (B-1) which is a metal salt wherein the metal of the metal salt is zinc.

48. The composition of claim 46, wherein the catalyst is (B-2) which is an ammonium salt which is formed from aminomethylpropanol.

49. The composition of claim 46, wherein the catalyst is (B-3) the acid, or ammonium or metal salt of the reaction product wherein the amine is aminomethylpropanol and the ammonium salt is formed from aminomethylpropanol.

50. A composition prepared by a process comprising the steps of:
(i) forming a mixture of (A) at least one aminoplast resin and
(B) at least one catalyst selected from the group consisting of
(B-1) an acid, or an anhydride, ester, ammonium salt or metal salt of the acid that is represented by one of the formulae

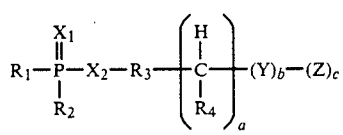  (I)

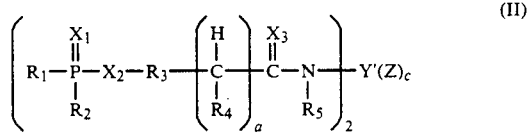  (II)

(B-2) an acid; or an ester, a metal salt or ammonium salt of a sulfo compound represented by the formula:

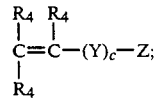  (III)

(B-3) an acid, or an ammonium or metal salt of a reaction product of at least one amine and the sulfo compound of (B-2); and mixtures thereof;
where in Formulae (I) and (II)
each $R_1$ and $R_2$ is independently a hydrocarbyl, hydrocarbyloxy or hydrocarbylthio group;
where in Formulae I, II, and III
each $X_1$ and $X_2$ is independently sulfur or oxygen;
each $R_3$ is independently a divalent hydrocarbyl group,
each $R_4$ and $R_5$ is independently a hydrogen or hydrocarbyl group;
a is 0 or 1;
b is 0 or 1;
c is 1 or 2;
Y is a divalent or trivalent hydrocarbyl group or $—C(X_3)NR_5Y'$;
$X_3$ is sulfur or oxygen;
Y' is a divalent or trivalent hydrocarbyl group provided that Y' is not divalent in Formula II;
Z is $—S(O)OH$, or $—S(O)_2OH$; (ii) heating the mixture from step (i).

51. The composition of claim 50 wherein step (i) further comprises placing the mixture into a mold.

* * * * *